March 28, 1950     C. D. COTTEN, JR., ET AL     2,502,249

AUTOMATIC SELECTIVE BATTERY CHARGER

Filed June 20, 1949

*INVENTORS,*
CLAUD D. COTTEN, JR.
& ERNEST F. NICHOLS

BY *Donald G. Dalton*

ATTORNEY

Patented Mar. 28, 1950

2,502,249

UNITED STATES PATENT OFFICE 2,502,249

AUTOMATIC SELECTIVE BATTERY CHARGER

Claud D. Cotten, Jr., Birmingham, and Ernest F. Nichols, Bessemer, Ala.

Application June 20, 1949, Serial No. 100,272

5 Claims. (Cl. 320—33)

1

This invention relates to electrical apparatus for charging electrical storage batteries, particularly to equipment for charging multiple cell storage batteries such as are used in Diesel electric locomotives, railroad car lighting systems, industrial trucks, etc.

To obtain maximum battery life it is common practice to periodically bring storage batteries to a full state of charge and then continue the charging until the individual cell voltages become equalized. This practice is maintained even in those instances wherein the batteries are used in conjunction with auxiliary generators as in the case of Diesel locomotives. In the latter instances the auxiliary generators are usually set at a lower charging voltage than is necessary to maintain full charge since to maintain full charge while in service requires such a high charging rate that heating accompanied by high water loss and deterioration of the battery plates would result.

In many shops it is not practical to standardize on a battery of a fixed number of cells or voltage and the maintenance of the batteries, therefore, requires the provision of chargers of different capacities. Under such circumstances batteries and chargers are frequently damaged by mistakenly or carelessly connecting a battery to a charger of too great or too small capacity.

It is, therefore, an object of the present invention to provide a charger capable of handling batteries of two or more different numbers of cells or voltages.

It is a further object to provide a charger which is so arranged that it cannot be placed in operation if the battery and the charging circuit are mismatched.

These and further objects will become apparent from the following specification when read in conjunction with the attached drawing in which:

The single figure is a schematic wiring diagram of a charger built in accordance with the teachings of this invention.

The charger, as shown in the drawing, is comprised of a D. C. generator 1 driven by a three-phase motor 2, which receives power from the lines L—1, L—2, and L—3 through a starter 3 which is comprised of a coil MC and the normally open contacts MC—1, MC—2, and MC—3. The coil MC is connected across lines L—2 and L—3 through the normally open contact WL—1 of a

2 relay 5. The relay 5 includes the contacts WL—1 and an operating coil WL. The motor 2 also drives an exciting generator 4 which supplies power to the field 1F of the generator 1. A fixed resistor R—1 in shunt connection with the normally open contact SR—7 of a relay 6 is provided in the field circuit of generator 1 whereby the voltage output of the generator can be shifted between two predetermined values. The relay 6 is termed the selector relay and is comprised of an operating coil SR, the normally open contacts SR—1, SR—3, SR—6, SR—7, and SR—8 and the normally closed contacts SR—2, SR—4, and SR—5. The armature circuit of the generator 1 is defined by the busses 7 and 8 which terminate in a battery charging plug CP. Bus 7 contains the variable resistor R—2 for adjusting the amperage in the armature circuit. The bus 8 contains the ammeter 9 and a reverse current relay 10, the latter comprised of a series drop-out coil RC, a shunt pick-up coil RCS and a contact RC—1. The reverse current relay is so designed that the contact is closed only when the pick-up coil is energized under which condition flow of current through the series coil aids in holding the contact closed. If, for any reason, current flow is reversed in the series coil, the contact is forced open. As shown in the drawing, the pick-up coil RCS is connected across the generator 1 by a wire 11. Thus the contact RC—1 is closed only when the generator is developing the proper voltage and if, for any reason, conditions develop which would permit current to flow from a battery connected to the charger the contact RC—1 would open. While a normally open relay might be substituted for the reverse current relay 10, the latter is preferred because of the protection it affords to both the generator and the battery. The connection of the coil RCS across the generator is made by the wire 11 either through the contact SR—5 (normally closed) or through the contact SR—6 (normally open) and the fixed resistor R—3. Also connected across the generator by a wire 12 is the operating coil SG of relay 13. In addition to the coil SG the relay 13 includes the normally closed contact SG—1. As thus connected the coil SG is energized only when generator 1 is operating. Connected across the busses 7 and 8 are circuits defined by wires 14, 15, 16, 17, and 18. The connections of these circuits to bus 8 are made on the battery side of the reverse current relay 10 so as to be operable independently of the generator 1.

The circuit 14 includes a coil SV of a relay 19, the normally closed contact SG—1 of relay 13 in shunt connection with the normally open contact SR—8 of relay 6. The relay 19 is a voltage relay designed to close only when a certain minimum voltage is impressed upon its operating coil SV. The circuit 15 includes the normally open contact SV—1 of relay 19 and the operating coil SR of relay 6. The circuit 16 includes the coil TVR—B of relay 20, the normally open contact TS—B1 of switch 21, the normally closed contact SV—2, and the normally closed contact SR—4. The circuit 17 includes the coil TVR—A of a relay 22, normally open contact TS—A1 of a switch 23 and the normally open contact SR—3 of relay 6. The circuit 18 includes the operating coil WL of relay 5, the fixed resistor R—4, the on-and-off switch 24 and the two parallel branches 25 and 26 which interconnect the circuit 18 with circuits 16 and 17, respectively. The switch 24 provides a means of shutting down the charger in an emergency. The branch 25 comprises the normally open contact SR—1 of relay 6 and the fixed resistor R—5 and is connected to the circuit 17 at a point between the coil TVR—A and the contact TS—A1. The branch 26, includes the normally closed contact SR—2 of relay 6, and connects to the circuit 16 at a point between the coil TVR—B and the contacts TS—B1. In addition to the contacts TS—B1 and TS—A1, the switches 21 and 23 also include the normally open contacts TS—B2 and TS—A2, respectively. The contact TS—B2 is located in the power circuit of a timer motor TSB which is powered from the lines L—2 and L—3. The power circuit of the motor TSB also includes the normally open contact TVR—B1 of relay 20. The contact TS—A2 is located in the power circuit of timer motor TSA. This motor is also powered from the lines L—2 and L—3 and its power circuit includes the normally open contact TVR—A1 of relay 22. The switches 21 and 23, their respective timer motors TSA and TSB and the voltage relays 20 and 22 are parts of commercial timing devices commonly used on battery chargers. Such devices are so designed that the switches must be manually closed but are automatically opened by the timing motors. The timing motors do not begin to operate until the average voltage per cell of the battery being charged reaches a certain predetermined value which causes the voltage relays to close and complete the power circuits to the motors. The motors then operate for a length of time which is selected when the devices are set by the operator. Since these devices are commercial equipment, only the switches, the timing motors, and the voltage relays have been shown in the drawing.

If desired, the voltage relays 20 and 22 can be eliminated, in which case the timing devices would consist of the switches 21 and 23 and their respective timing motors TSA and TSB. Under this variation the motor TSA or TSB would be immediately put into operation upon manually closing of the proper time switch and remain in operation for the entire period of the charging cycle.

As a specific example of the operation of the present equipment, assume that the battery charger has been designed to apply an equalizing charge to either a 32 cell battery or a 56 cell battery such as those commonly used on Diesel locomotives. Initially the timing motors TSA and TSB are adjusted to the length of time in hours that is required to effect charging of the batteries, and the rate of charge is adjusted by means of the variable resistor R—2 in the armature circuit of generator 1. Once these initial adjustments are made, it is not normally necessary to change them. The switch 21 is for use when charging 32 cell batteries; the switch 23, when charging 56 cell batteries. As previously mentoined, these switches are manually closed but automatically opened by their respective timing motors TSA and TSB. The relays 20 and 22, which also form part of the timing mechanism, are designed to close when the average cell voltage of the battery on charge is 2.37 volts per cell. The relay 19 is designed to close when a 90 volt potential is impressed across its operating coil SV.

If it is desired to charge a 32 cell battery, the procedure is as follows:

The battery plug CP is plugged into the receptacle CR of the battery connecting the battery to the busses 7 and 8. When delivered to be charged, a 32 cell battery will have a maximum voltage of 2.1 volts per cell or 67.2 volts per battery. This potential (67.2 volts) is not sufficient to energize the coil SV of the voltage relay 19. Consequently, the contact SV—1 will not close and the coil SR in selector relay 6 cannot be energized. Therefore, all normally closed SR contactors will stay closed and all normally open SR contactors will stay open. Since the latter includes the normally open contact SR—7, the resistance R—1 is in circuit with the field 1F of the generator 1 and the voltage output of the generator will thereby be limited to a value adapted to charge a 32 cell battery. The contacts SR—1 and SR—3 are also normally open contacts, thus the circuits 17 and 25 cannot be completed. Similarly, the contact SR—6 is a normally open contact; therefore, the resistance R—3 is removed from the power circuit of the coil RCS of the reverse current relay 10. The net effect of the voltage relay 19 is, therefore, to set up only those circuits necessary to the charging of a 32 cell battery and to lock out any circuits which would result in excessive voltage being applied to the battery.

Having plugged the battery into the charger, the operator manually closes the off-on switch 24 and manually closes the time switch 21, thus closing contacts TS—B1 and TS—B2. Closing the contact TS—B1 completes circuits 16, 18 and 26. Since the circuit 18 contains the operating coil WL of relay 5, the relay 5 is energized closing its contact WL—1 which completes the circuit containing the coil MC of the starter 3 and causes contacts MC—1, MC—2, and MC—3 to close starting the motor 2 of the motor generator set. As the voltage of generator 1 builds up the pickup coil RCS of the reverse current relay 10 closes the contact RC—1 connecting the generator to the battery. The build up of voltage of generator 1 also energizes the coil SG of relay 13, opening the normally closed contact SG—1 in circuit 14. Since contact SR—8 in circuit 14 is normally open, the opening of contact SG—1 makes it impossible for coil SV in circuit 14 to become energized regardless of how high the voltage of generator 1 builds up. Since coil SV cannot be energized, coil SR in relay 6 cannot become energized at any time during the charging of a 32 cell battery.

As the charging proceeds, the average cell voltage is increased. When the average cell voltage reaches a value of 2.37 volts the coil TVR—B of relay 20 in circuit 16 will close the contact TVR—B1 in the power circuit of the timing motor TSB. This action completes the circuit of motor TSB and the motor will operate for the set time interval at the end of which it will open contacts TS—B1 and TS—B2 of the switch 21, stopping the motor TSB and de-energizing the coil WL of relay 5, which in turn opens the contacts WL—1 de-energizing the coil MC of the starter 3 shutting down the generator.

When delivered to the charger, the minimum voltage of a 56 cell battery is 1.8 volts per cell or 100.8 volts per battery. Thus, when a 56 cell battery is plugged into the charger, sufficient voltage is impressed across the coil SV of relay 19 to cause the relay to operate, closing the contact SV—1 in circuit 15 and opening the contact SV—2 in circuit 16. The closing of contact SV—1 completes circuit 15 and the coil SR of relay 6 becomes energized closing normally open contacts 1, 3, 6, 7, and 8 and opening normally closed contacts 2, 4, and 5. This action sets up all circuits necessary for the charging of a 56 cell battery and locks out the remaining circuits. Thus, the closing of contact SR—7 shunts out the resistance R—1 in the field IF of generator 1, shifting the voltage output of generator 1 to a higher range required for charging a 56 cell battery. The closing of SR—6 and the opening of SR—5 puts resistance R—3 in series with coil RCS of relay 10 protecting this coil from the effects of the higher voltage. Closing of SR—1 and SR—3 sets up circuits 17, 18, and 25; the opening of SR—2 and SR—4 locks out circuits 16 and 26.

When the operator manually closes off-and-on switch 24 and the contacts TS—A1 and TS—A2 of time switch 23, coil WL of relay 5 is energized closing the contacts WL—1 energizing coil MC of starter 3 completing the power circuit to the motor 2. As the voltage output of generator 1 builds up coil RCS closes the contact RC—1 of relay 10. At the same time, the build up of voltage from the generator energizes the coil SG of relay 13 through circuit 12 and opens the contact SG—1 in circuit 14. However, inasmuch as normally open contact SR—8 has been previously closed, the opening of contact SG—1 does not affect the operation of coil SV in the circuit 14. When the charge on the battery is built up so that the average voltage per cell is 2.37 volts, the coil TVR—A of relay 22 in circuit 17 will pull in the contact TVR—A1 in the power circuit of timing motor TSA causing the motor TSA to operate for such time as has been previously selected in setting timing device of which switch 23, relay 22, and motor TSA are parts. At the end of this time period, the motor TSA will open the contacts TS—A1 and TS—A2 shutting down the charger.

It will be noted as in the case when charging a 32 cell battery, the circuit is only set into operation when the proper timing switch is closed and that should any condition arise which would cause voltage output of generator 1 to drop so that current could flow from the battery, the coil RC of reverse current relay 10 would function to open the circuit to the generator. The charger of the present invention, therefore, provides complete and foolproof protection for both the battery and the parts of the charger. Overcharging is prevented by the automatic shutdown feature.

It is possible by adding additional voltage relays and selector relays to provide a charger capable of handling batteries of three or more different sizes.

While we have shown and described a specific embodiment of our invention, it will be apparent that other adaptations and modifications may be made without departing from the scope of the following claims.

We claim:

1. A battery charger comprising a motor generator set, a field circuit for said generator, a resistance in said field circuit, a normally open relay contact in parallel with said resistance, a starter for said motor, a relay coil for actuating said contact, a circuit connecting said generator to the battery to be charged, a minimum voltage relay coil connected across the last named circuit, and a normally open contact in series with the first named relay coil, said last named contact being operable by the minimum voltage relay.

2. A battery charger comprising a motor generator set, a field circuit for said generator, a resistance in said field circuit, a normally open relay contact in parallel with said resistance, a starter for said motor, a relay coil for actuating said contact, a circuit connecting said generator to the battery to be charged, a reverse current relay in said generator circuit, a minimum voltage relay coil connected across the last named circuit, and a normally open contact in series with the first named relay coil, said last named contact being operable by the minimum voltage relay.

3. A battery charger comprising a motor generator set, a field circuit for said generator, a resistance in said field circuit, a normally open relay contact in parallel with said resistance, a starter for said motor, a relay coil for actuating said contact, a circuit connecting said generator to the battery to be charged, a minimum voltage relay coil connected across the last named circuit, a normally open contact in series with the first named relay coil, said last named contact being operable by the minimum voltage relay, and means for automatically stopping said motor when the battery is charged.

4. A battery charger comprising a motor generator set, a field circuit for said generator, a resistance in said field circuit, a normally open relay contact in parallel with said resistance, a starter for said motor, a relay coil for actuating said contact, a circuit connecting said generator to the battery to be charged, a minimum voltage relay coil connected across the last named circuit, a normally open contact and a normally closed contact connected in series with the minimum voltage relay and in shunt with each other, the last named normally open contact being operable by the first named relay coil, a relay coil connected across the generator for operating the last named normally closed contact, and a normally open contact in series with the first named relay coil, said last named contact being operable by the minimum voltage relay.

5. A battery charger comprising a motor generator set, a field circuit for said generator, a resistance in said field circuit, a normally open relay contact in parallel with said resistance, a starter for said motor, a relay coil for actuating said contact, a circuit connecting said generator to the battery to be charged, a reverse current relay in said generator circuit, a minimum voltage relay coil connected across the last named circuit, a normally open contact and a normally closed contact connected in series with the minimum voltage relay and in shunt with each other, the last named normally open contact being operable by the first named relay coil, a relay coil connected across the generator for operating the last named normally closed contact, a normally open contact in series with the first named relay coil, said last named contact being operable by the minimum voltage relay, and means for automatically stopping said motor when the battery is charged.

CLAUD D. COTTEN, JR.
ERNEST F. NICHOLS.

REFERENCES CITED

The following references are of record in the file of this patent:

UNITED STATES PATENTS

| Number | Name | Date |
|---|---|---|
| 1,024,448 | Halbleib | Apr. 23, 1912 |
| 1,140,106 | Bijur | May 18, 1915 |
| 1,268,438 | Crosby | June 4, 1918 |
| 1,400,268 | Cully | Dec. 13, 1921 |
| 1,471,897 | Jacobs | Oct. 23, 1923 |
| 1,805,140 | Graybill | May 12, 1931 |
| 1,834,280 | Jupp et al. | Dec. 1, 1931 |
| 1,947,204 | Hoxie | Feb. 13, 1934 |
| 2,081,829 | McNairy | May 25, 1937 |
| 2,099,640 | Woodbridge | Nov. 16, 1937 |
| 2,152,576 | Weeks | Mar. 28, 1939 |
| 2,333,617 | Smith | Nov. 2, 1943 |